United States Patent Office 3,244,692
Patented Apr. 5, 1966

3,244,692
REACTION PRODUCT OF AN AZODICARBOXYL-
ATE AND AN AMINE
George E. Ham, Leawood, Kans., assignor, by mesne assignments, to Gulf Oil Corporation, Pittsburgh, Pa., a corporation of Pennsylvania
No Drawing. Filed Sept. 4, 1962, Ser. No. 221,351
5 Claims. (Cl. 260—154)

This invention relates to foaming agents for thermoplastic polymers, to foamable thermoplastic polymer compositions containing such foaming agents, to methods of foaming such compounds and to foamed polymers produced by such methods.

Foamed thermoplastic polymers are of significant commercial interest because they are light-weight and relatively inexpensive, have excellent chemical stability and are easily fabricated into a wide variety of useful articles such as insulated containers for cold foods, buoyant fillings for life preservers, toys, disposable coffee cups and so forth.

In a typical foaming process the foaming agent is admixed intimately with the thermoplastic polymer resin and the mixture is heated in a mold to above the decomposition temperature of a foaming agent, whereupon the foaming agent decomposes to yield gaseous products which cause the polymer to foam. Thereafter the polymer is cooled and retains its foamed configuration.

The use of foamed polymers as electrical insulation is an area of considerable potential which has not yet been exploited fully because the foaming agents heretofore available introduce substances into the foamed material which seriously detract from the otherwise excellent electrical insulating properties of the thermoplastic polymer resins. For example, azodicarbonamide, which is widely used as a foaming agent, begins to decompose at 196° C., but to achieve an acceptable rate of gas evolution the temperature must be raised to about 230° C. This temperature is undesirably high for extrusion wire coating processes for certain of the foamed polymers such as plasticized polyvinyl chloride will sag on the wire. To achieve a sufficiently high rate of gas evolution at a lower temperature it is necessary to "promote" the decomposition by the addition of ionic or polar substances such as metallic salts and oxides, glycols, organic acids or organic bases to the foaming agents. These "promoters" remain in the foamed polymer and adversely affect its electrical insulating properties. In addition the solid residues of the decomposition of azodicarbonamide are hygroscopic which further limits its value as a foaming agent for preparing electrical insulation.

Other foaming agents in current use such as p,p′-oxybis-(benzenesulfonylhydrazide) and di-N-nitrosopentamethylenetetramine actually produce water as a decomposition product. This water of decomposition remains in the foamed polymer and renders it unsuitable for electrical insulation.

In my co-pending application, Ser. No. 179,219, filed March 12, 1962, I have described a series of foaming agents which produce foamed thermoplastic polymers which have desirable electrical insulating properties. Broadly, these foaming agents are the N,N′-substituted azodicarbonamides which may be obtained by reacting an azodicarboxylate with a monoamine.

I have now discovered another class of foaming or "blowing" agents which are similarly useful for producing foamed thermoplastic polymers for use as electrical insulation. The foaming agents which are the subject of this application are N-substituted carbonamide-type products which have the general formulas:

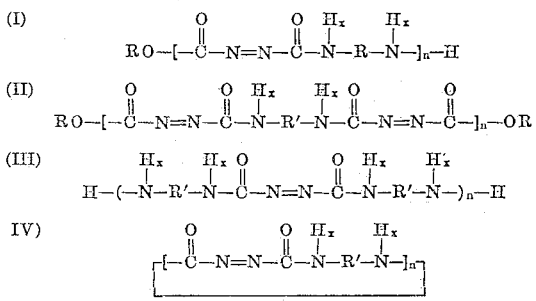

wherein $n$ is a small positive integer, R is a lower alkyl group, R′ is a lower alkylene, di-(lower alkylene) or an arylene group and $x$ equals one unless R′ is a di-(lower alkylene) group, in which case $x$ equals zero.

Compounds of the above type may be obtained by the reaction of a lower-alkyl azodicarboxylate with an amide-forming polyamine under carbonamide-forming conditions. The product of this type of reaction undoubtedly contains at least minor amounts of each of the molecular species described above. It is believed, however, that the relative proportions of the species can be varied by varying the molar ratios of the reactants. Thus, when the reactants are present in equimolar quantities it is believed that the predominant product is a monomer or a low polymer of type I. In the special case where the molecular dimensions and bond angles of the reactants will permit it is believed that a product having a cyclical configuration as type IV is formed.

Where the reaction is carried out with a molar excess of the polyamine reactant it is believed that a product of type III will predominate. A molar excess of the azodicarboxylate is believed to favor the formation of a product of type II above.

The reaction between the azodicarboxylate and the polyamine is suitably carried out in the liquid state. The azodicarboxylate may be dissolved in an appropriate solvent such as ethanol or ethyl ether. The polyamines may then be dissolved in the azodicarboxylate solution or may be separately dissolved in a suitable solvent, advantageously the same solvent used for the azodicarboxylate, and the polyamine solution may then be added to the azodicarboxylate solution. The carbonamide-type reaction product will typically precipitate as a solid which may be separated from the reaction mixture by conventional techniques.

The foaming agents which I have described decompose within the temperature limits required for wire coating processes, i.e., below the temperature at which unnecessary softening of the polymer occurs, without the formation of water or hygroscopic solids as decomposition products and without the necessity of adding ionic, polar or hygroscopic "promoters." They are nonhazardous and are stable at the temperatures required for intimately admixing them with the thermoplastic polymers in mill rolls, Banbury mixers, dry tumblers, ball mills, and the like preparatory to the foaming step.

In addition to the themoplastic polymer and the blowing agent, the foamable compositions of the invention also can include additional components such as pigments, fillers, plasticizers, colorants, stabilizers, lubricants, and the like. It has been observed that the cell size of the foamed resin can in some cases be reduced by incorporating in the foamable compositions a finely divided inorganic silicon containing material such as silicon dioxide, calcium silicate, diatomaceous earth, and the like. Such inorganic silicon materials should preferably have a particle size of less than about five microns and more especially less than about one micron. In addition, the incorporation of di- and trivalent metal salts of fatty acids containing eight or more carbon atoms into the compositions of the invention can under some circumstances have the beneficial effect of reducing the cell size of the foamed polymer. Typical examples of such salts include the barium, magnesium, aluminum, calcium, and zinc salts of such acids as octanoic acid, palmitic acid, hydroxystearic acid, erucic acid, and so forth.

The lower-alkyl azodicarboxylate which is used to prepare the foaming agents of this invention may itself be prepared by the oxidation of the corresponding lower-alkyl hydrazodicarboxylate with fuming nitric acid in acetic anhydride. Because of its stability and the convenience of its separation fraom the oxidation mixture ethyl azodicarboxylate is the preferred intermediate for the practice of my invention although other lower-alkyl azodicarboxylates such methyl, n-propyl, i-propyl, n-butyl, i-butyl azodicarboxylates and the like are similarly useful.

The polyamines which are useful in the practice of my invention include the lower alkylene diamines such as ethylene and propylene diamine, the di-(lower alkylene) diamines such as piperazine (di-ethylene diamine) and substituted piperazines such as 2,5-dimethylpiperazine, and aryl polyamines such as arylene diamines, for example, phenylene diamines, xylylene diamines and so forth.

The thermoplastic polymers which can be foamed by the use of the foaming agents above described can be virtually any of the thermoplastic polymers known to the art. Thus, for example, my foaming agents can be used to foam styrene polymers, including styrene homopolymers and copolymers of styrene with up to 50% of comonomers such as acrylate and methacrylate esters, acrylonitrile, and the like, graft copolymers of styrene with dienes, particularly the ABS-type graft copolymers, vinyl chloride polymers including vinyl chloride homopolymers and copolymers of vinylchloride with up to 50% of comonomers such as vinyl acetate, vinylidine chloride, esters of fumaric and maleic acid, acrylate and methacrylate esters and so forth. Other suitable resins which can be foamed with the foaming agents here described include the diene rubbers, both natural and synthetic, the acrylate ester polymers, the methacrylate ester polymers, nylon-6, nylon-6,6, the polycarbonates and the newer formaldehyde polymers such as Delrin and so forth.

Especially useful foamable compositions are obtained by admixing the foaming agents hereabove described with thermoplastic polymers of a 2–4 carbon atom alpha olefin, e.g., ethylene, propylene, and butene-1. The olefin polymer can be a homopolymer of any one of the olefin species set forth above or can be a copolymer derived solely from these olefins, such as an ethylene-propylene copolymer. The olefin copolymers also can be copolymers having polymerized therein at least fifty weight percent of an alpha olefin with up to fifty weight percent of a vinylidine monomer copolymerizable therewith. Typical examples of suitable comonomers include the vinyl halides such as vinyl chloride, conjugated 1,3-diolefins such as butadiene and isoprene, vinyl esters of monobasic organic acids such as vinyl acetate, vinyl benzoate, and vinyl stearate, esters, amides, and nitriles of alpha, beta-ethylenically unsaturated monobasic acids, such as the methyl, ethyl, and octyl acrylates, the corresponding esters of methacrylic acid, acrylonitrile, methacrylonitrile, acrylamide, and methacrylamide and so forth.

In order to more clearly describe my invention and the practice thereof I offer the following examples of the practice thereof.

Example I

This example illustrates the preparation and use of a foaming agent which can be prepared by the reaction of ethylazodicarboxylate with ethylene diamine.

200 g. of ethyl azodicarboxylate (1.15 mols) was dissolved in 1 liter of absolute ethanol. To this solution was slowly added 69.6 g. of ethylene diamine (1.16 mols). A light-tan solid precipitated from the reaction mixture. The solid was filtered from the reaction mixture and washed with two 100-ml. portions of absolute ethanol and dried. The dried product weighed 170 g.

A second preparation was carried out in which 300 g. of ethyl azodicarboxylate (1.72 mols) in 2 liters of absolute ethanol was reacted as described above with 104.5 g. of ethylene diamine (1.73 mols). Again the light-tan solid product was filtered out of the reaction mixture and dried.

The products of the two preparations above were combined, washed several times with absolute alcohol and dried. The combined product weighed 450 g.

The product was insoluble in water, acetone, boiling methanol, boiling absolute ethanol, hot toluene, hot N,N-dimethyl formamide and 1 N hydrochloric acid. A portion of the product analyzed as follows:

| | Weight percent |
|---|---|
| Carbon | 33.7 |
| Hydrogen | 5.5 |
| Nitrogen | 35.1 |
| Oxygen (by difference) | 25.7 |

This analysis does not conform to the theoretical analysis for any one of the several postulated species indicating that the actual product is a mixture of several or possibly all of the species.

The product melted at 207–211° C. with vigorous decomposition. At 225° C. the product yields 146 ml. of gas per gram in 30 seconds; at 140° C. the product yields 49 ml. of gas per gram in one minute.

The foaming agent product was mixed with polyethylene in a Reed Miniature Intensive Mixer at a level of 2.5 parts of the foaming agent per 100 parts of polymer (weight basis). The mixer was operated at 150 r.p.m. for about 10 minutes. The resulting polymer-foaming agent mixture was placed in a convex press die and heated to about 100° C. for one hour. The die was then placed between the platens of a convex press at a pressure of 2 tons/square inch until the die cooled to room temperature. This pressing operation gave a uniformly shaped cylindrical plug of the polymer-foaming agent mixture. The die was then heated at 180–195° C. for 30 minutes to decompose the foaming agent. Then the die was quenched with ice water to "set" the polymer and the foamed polymer plug was removed. The foam occupied twice the original volume of the polymer-foaming agent plug, i.e., the expansion was 100%.

The foamed polymer prepared as above contains no water or hygroscopic, polar or ionic solids and is a desirable electrical insulating material.

Example II

This example illustrates the preparation and use of a foaming agent which can be prepared by the reaction of ethylazodicarboxylate with piperazine.

4.32 g. (0.05 mol) of piperazine was dissolved in 25 ml. of absolute ethanol and the resulting solution was added dropwise to a solution of 8.78 g. ethylazodicarboxylate (0.05 mol) in 25 ml. of absolute ethanol. During the addition the temperature of the reaction mixture rose from 24° C. to 45° C. and a white solid product precipitated. The reaction mixture was refluxed for ½ hour. The solid product was collected on a filter, was washed with 15 ml. of absolute ethanol and then air-dried. The product, weighing 7.1 g., was recrystallized from acetonitrite. The recrystallized product melted at 180–181° C. with vigorous decomposition. The product yields 53 ml. of gaseous decomposition products per gram when heated at 215° C. for 4 minutes.

The foaming agent prepared above incorporated in polypropylene and foamed as in Example I produces a foamed polymer which is free of water and hygroscopic, polar or ionic residues and is a desirable electrical insulating material.

*Example III*

The foaming agent preparation procedures of Example II were repeated except that the polyamine was p-phenylene diamine and the solvent used for both reactants was ethyl ether. The dark-red reaction mixture was concentrated to yield a dark red solid product which melted over the range 98–110° C. with decomposition; heating to higher temperatures did not induce further gas evolution. When this solid product is employed as a foaming agent as in Examples I and II similar results are obtained.

*Example IV*

An orange solid product was obtained by the reaction of 1.0 g. propylene diamine in 20 ml. ether with 2.0 g. ethyl azodicarboxylate. The product was washed with several portions of Skellysolve "F" and then treated with boiling methanol in which it did not dissolve. The light-tan solid obtained from this treatment melted at 206–210° C. with decomposition and gas evolution. When used as a blowing agent for polyethylene as in Examples I and II above similar results are obtained.

Having thus described my invention and the practice thereof, I claim:

1. The product obtained by reacting in the liquid state a lower alkyl azodicarboxylate and an amine selected from the group consisting of lower alkylenediamine, piperazine and p-phenylenediamine, both the alkyl azodicarboxylate and the amine being dissolved in a solvent in which said product forms a solid precipitate.

2. The product obtained by reacting in the liquid state ethyl azodicarboxylate and ethylenediamine, both the azodicarboxylate and the diamine being dissolved in a solvent in which said product forms a solid precipitate.

3. The product obtained by reacting in the liquid state ethyl azodicarboxylate and piperazine, both the azodicarboxylate and the diamine being dissolved in a solvent in which said product forms a solid precipitate.

4. The product obtained by reacting in the liquid state ethyl azodicarboxylate and p-phenylenediamine, both the azodicarboxylate and the diamine being dissolved in a solvent in which said product forms a solid precipitate.

5. The product obtained by reacting in the liquid state ethyl azodicarboxylate and propylenediamine, both the azodicarboxylate and the diamine being dissolved in a solvent in which said product forms a solid precipitate.

References Cited by the Examiner

UNITED STATES PATENTS

| | | | |
|---|---|---|---|
| 2,741,658 | 4/1956 | Riehen et al. | 260—174 |
| 2,741,659 | 4/1956 | Riehen et al. | 260—174 |
| 2,744,076 | 5/1956 | Breuer et al. | 260—2.5 |
| 2,754,276 | 7/1956 | Walker et al. | 260—2.5 |

CHARLES B. PARKER, *Primary Examiner.*

L. J. BERCOVITZ, *Examiner.*